United States Patent [19]
Wakamatsu et al.

[11] Patent Number: 5,905,935
[45] Date of Patent: May 18, 1999

[54] FINISHER CAPABLE OF FOLDING A PAPER IN A Z-SHAPE WHEN THE PROPERTIES OF A PRINTED IMAGE IS AFFECTED

[75] Inventors: Shinji Wakamatsu; Tadashi Kobayashi, both of Toyokawa; Hiroyuki Yoshikawa, Aichi-ken, all of Japan

[73] Assignee: Minolta Co., Ltd., Osaka-fu, Japan

[21] Appl. No.: 09/007,791

[22] Filed: Jan. 15, 1998

[30] Foreign Application Priority Data

Jan. 16, 1997 [JP] Japan ................................. 9-005742

[51] Int. Cl.⁶ ........................... G03G 15/00; B42C 19/00
[52] U.S. Cl. ........................... 399/407; 270/32; 382/292; 382/297; 399/86
[58] Field of Search ........................... 399/407, 408, 399/38, 83, 86, 370, 376; 270/32, 45, 58.08; 358/296, 449, 452; 395/102, 116; 382/297, 286, 292, 298

[56] References Cited

U.S. PATENT DOCUMENTS

| | | | |
|---|---|---|---|
| 4,202,621 | 5/1980 | Yoshimura et al. | 399/407 |
| 5,207,412 | 5/1993 | Coons, Jr. et al. | 270/45 X |
| 5,344,130 | 9/1994 | Suzuki et al. | 270/58.02 |
| 5,649,003 | 7/1997 | Morikawa et al. | 382/297 |
| 5,768,677 | 6/1998 | Natsume | 399/376 |

FOREIGN PATENT DOCUMENTS 03-183596  8/1991  Japan .

*Primary Examiner*—Matthew S. Smith
*Assistant Examiner*—Sophia S. Chen
*Attorney, Agent, or Firm*—Burns, Doane, Swecker & Mathis, L.L.P.

[57] ABSTRACT

A finisher connected to a digital copying machine includes a folding device for folding output paper into Z shape, a binding device for binding a sheaf of the papers into a preset size, and a control unit that determines whether image property will be affected or not when the images are printed on the A4 size paper, and print on the A3 size paper and fold the A3 paper into the Z-shape if it is determined that the property will be affected. Therefore, even if the original document size is different from the exclusive use cover size, the finisher provides good legibility of the characters printing its output automatically on paper of a proper size matching the exclusive use cover. In other words, good-looking bookbinding can be easily accomplished for documents of varying sizes without manually adjusting enlargement/reduction factors.

28 Claims, 17 Drawing Sheets

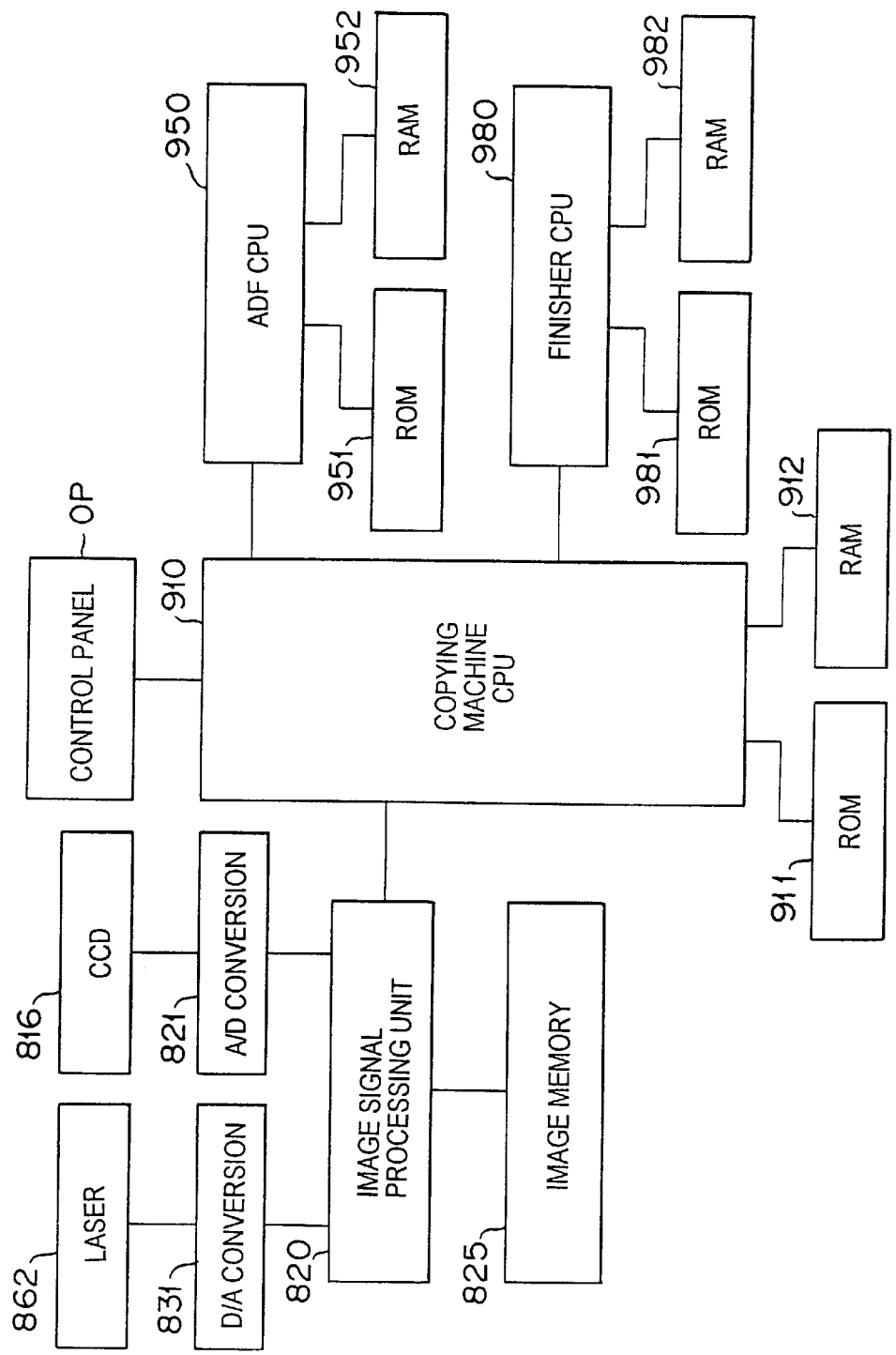

FIG. 3A

| (MEMORY ADDRESS) | REGION | COMPRESSED CODED DATA |
|---|---|---|
| 0 | 01 | CODED DATA 1 OF PAGE 1 |
| 32K | 02 | CODED DATA 1 OF PAGE 2 |
| 64K | 03 | CODED DATA 2 OF PAGE 1 |
| 96K | 04 | CODED DATA 2 OF PAGE 2 |
| 128K | . | |
| | . | |
| | . | |

FIG. 3B

MANAGING TABLE MT

| REGION | PAGE | FORWARD | BACKWARD | INFORMATION |
|---|---|---|---|---|
| 01 | 1 | 00 | 02 | |
| 02 | 1 | 01 | FF | |
| 03 | 2 | 00 | 04 | |
| 04 | 2 | 03 | FF | |
| . | | | | |
| . | | | | |
| . | | | | |

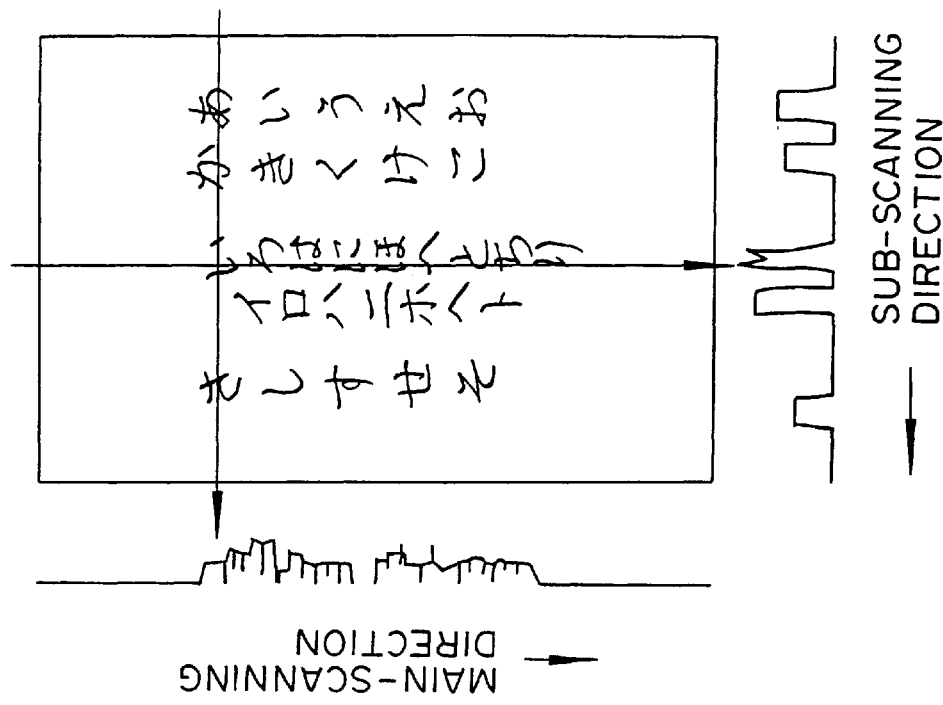
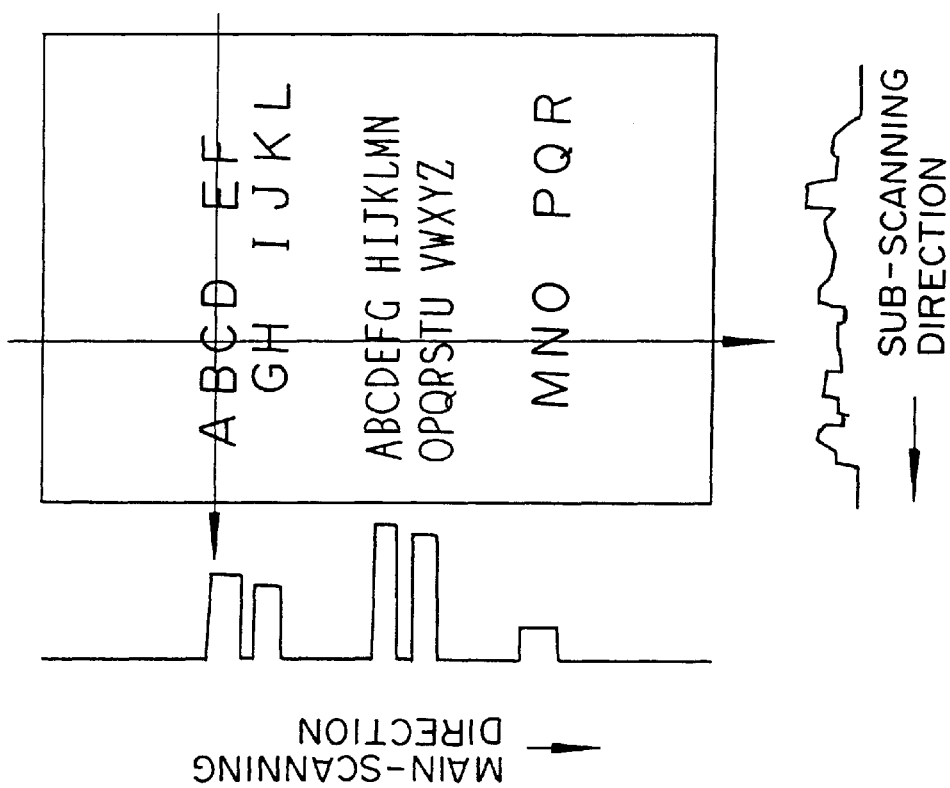

FIG.15A
(INITIAL DOCUMENT MANAGING TABLE DT)

| PAGE | DOCUMENT LENGTH AS MAIN-SCANNING DIRECTION | DOCUMENT LENGTH AS SUB-SCANNING DIRECTION | INSTRUCTION PAPER; ENLARGEMENT/REDUCTION RATIO; ROTATION; FOLDING |
|---|---|---|---|
| 1 | | | |
| 2 | | | |
| 3 | | | |
| 4 | | | |
| 5 | | | |
| . . . | . . . | . . . | . . . |

FIG. 15B (COMPLETE DOCUMENT MANAGING TABLE DT)

| PAGE | DOCUMENT LENGTH AS MAIN-SCANNING DIRECTION | DOCUMENT LENGTH AS SUB-SCANNING DIRECTION | INSTRUCTION PAPER; ENLARGEMENT/REDUCTION RATIO; ROTATION; FOLDING |
|---|---|---|---|
| 1 | (A4) 297 | 210 | |
| 2 | (A4) 297 | 210 | |
| 3 | (A3) 297 | 420 | A4  71%  90° |
| 4 | (B4) 257 | 364 | A3  Z-FOLDING |
| 5 | (B5) 257 | 182 | A4  115% |
| . . . | . . . | . . . | . . . |

FINISHER CAPABLE OF FOLDING A PAPER IN A Z-SHAPE WHEN THE PROPERTIES OF A PRINTED IMAGE IS AFFECTED

BACKGROUND OF THE INVENTION

1. Field of the Invention

The invention relates to a finisher, which is attached to a copying machine, for inserting papers with a copied image into an exclusive use cover and binding them together to produce a bound document.

2. Description of the Related Art

A finisher is an apparatus normally used in conjunction with a copying machine or a printing machine to place copied sheets of paper under an exclusive use cover, glue them together on the spine of the cover, and bind them automatically to produce a bound document.

This exclusive use cover used for bookbinding is coated with hot-melt adhesive on the inside of an area which corresponds to the spine. The bookbinding is accomplished by heating the spine after inserting a sheaf of papers into such an exclusive use cover to glue them together.

In such a finisher, the sizes of the covers used are standardized to match standard size paper, e.g., A4 and B5 size paper. Consequently, the paper to be bound with such a cover must also have a certain size to fit the cover, i.e., odd size paper can cause various problems. For example, if the paper that does not fit one of the exclusive use covers is used on the finisher, the resultant bound papers will look bad. An improper size of paper causes bad looks, not only when it is too large for the cover, but also when it is too small. An improper size of paper also causes problems in gluing in that the sheets of paper glued to the cover may be insecurely held and can be easily peeled off.

Such problems are particularly conspicuous in a copying machine. This is due to the fact that the size of documents fed into a copying machine is not uniform and has no bearing on the size of the paper to be copied onto. On the other hand, in a case where the output paper size can be specified as in the case of a printer, all that is needed then is to specify a size of paper that matches the size of the exclusive use cover. In other words, the size difference between the exclusive use cover and the paper will never occur in such a case.

The simplest solution for these problems is to match the size of the exclusive use cover with that of the paper being used. However, since the size of the original to be copied varies, it is cumbersome to instruct the copying machine either to enlarge or reduce depending on the situation. Moreover, if the size of a copy has to be reduced from the original, the legibility of characters will be affected, so that the end result, although the bound document itself may be satisfactory in terms of an appearance, may not be useful after all if the legibility of the copied characters is poor.

SUMMARY OF THE INVENTION

The purpose of the present invention is to provide a finisher capable of folding paper in a Z-shape after printing on paper of the preset size, and binding multiple sheets of the paper together, when there is a concern that the properties of the printed image will be affected.

Another purpose of the present invention is to provide a finisher system equipped with a print unit capable of folding paper in a Z-shape after printing on paper of a size that is twice the preset size, and binding multiple sheets of the paper together, when there is a concern that the properties of the printed image will be affected.

Yet another purpose of the present invention is to provide a finisher system equipped with an enlargement/reduction unit and a print unit capable of folding paper in a Z-shape after printing on paper of a size that is twice the preset size, and binding multiple sheets of the paper together, when there is a concern that the properties of the printed image will be affected when the image is printed in a reduced size.

Yet another purpose of the present invention is to provide a finisher system equipped with a copying device capable of folding paper in a Z-shape after forming an original image on paper of a size that is twice the preset size, and binding multiple sheets of the paper together, when there is a concern that the properties of the copied image of the original will be affected.

One aspect of the present invention is a finisher connected to an image forming apparatus, comprising: a folding device which folds printed paper into a Z-shape; a binding device which binds a sheaf of papers into a preset size; and a control unit which determines whether a property of an image will be affected or not when the image is printed on a paper of a preset size, and prints the image on the paper of the preset size if it is determined that the property will not be affected, or folds the paper into the Z-shape after printing if it is determined that the property will be affected.

Another aspect of the present invention is a finisher system for printing images and binding printed paper, comprising: a printing device which prints an image; a folding device which folds a printed paper into a Z-shape; a binding device which binds a sheaf of papers into a preset size; and a control unit which determines whether image property will be affected or not when the image is printed on the paper of the preset size, and prints the image on the paper of the preset size if it is determined that said property will not be affected, or prints the image on a paper twice as large as the preset size and folds the paper into the Z-shape if it is determined that said property will be affected.

Yet another aspect of the present invention is a finisher system for printing images and binding printed paper, comprising: an enlargement/reduction unit which enlarges or reduces an image; a printing device which prints an enlarged or reduced image on a paper of a preset size; a folding device which folds a printed paper into a Z-shape; a binding device which binds a sheaf of papers; and a control unit which determines whether an image property will be affected or not when a reduced image is printed on the paper of the preset size, and prints the reduced images on the paper of the preset size if it is determined that said property will not be affected, or prints the image on a paper twice as large as the preset size and folds the paper into the Z-shape if it is determined that said property will be affected.

Yet another aspect of the present invention is a finisher system for binding papers after copying, comprising: a copying device which copies an original documents; a folding device which folds a paper having an image copied in said copying device into a Z-shape; a binding device which binds a sheaf of papers into a preset size; and a control unit which determines whether a document property will be affected or not when a document image is copied on the paper of the preset size, and copies the image on the paper of the preset size if it is determined that said property will not be affected, or copies the image on a paper twice as large as the preset size and folds the paper into the Z-shape if it is determined that said property will be affected.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 2 is a block diagram illustrating the control system for the copying machine and the finisher;

FIG. 3 is a table illustrating the management of the image memory for the copying machine;

FIG. 12 is an explanatory drawing illustrating operations for identifying vertical vs. horizontal writings in a document image;

FIG. 15 is a document managing table used in the copying machine;

DETAILED DESCRIPTION OF THE PREFERRED EMBODIMENT

The embodiments of this invention will be described below with reference to the accompanying drawings.

The constructions of a copying machine equipped with a finisher of the present invention and the finisher itself will be explained below, followed by the explanation of the image processing operations using said copying machine equipped with the finisher.

<<CONSTITUTION OF COPYING MACHINE>>

Figure 1:
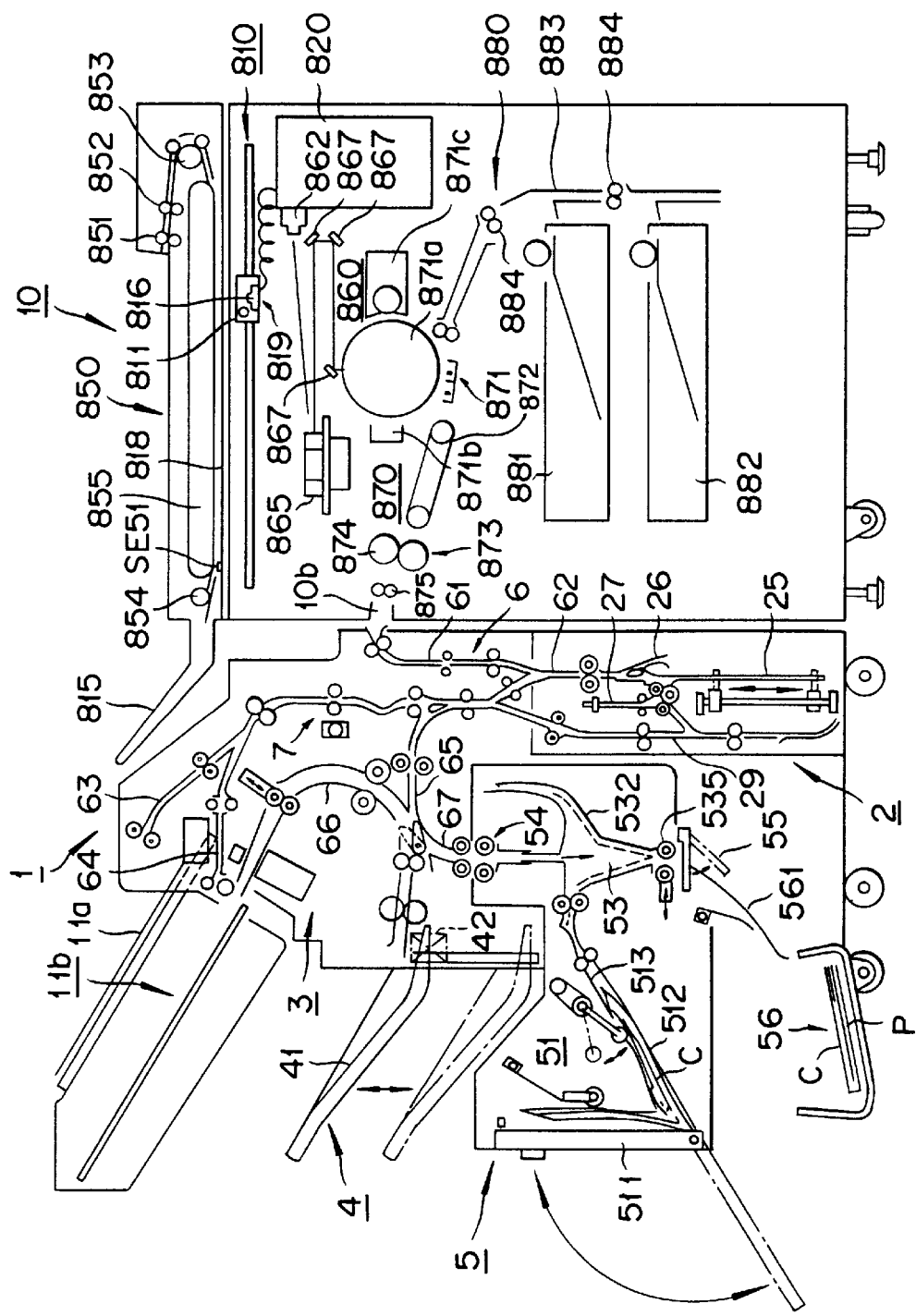
FIG. 1 is a view illustrating the general construction of a copying machine and a finisher according to the present invention.

FIG. 1 is a schematic drawing used to explain the general constructions of a copying machine according to the present invention. FIG. 2 is a block diagram of the control system of the same.

A copying machine 10 is a so-called digital copying machine.

The copying machine 10 roughly comprises: a scanning system 810 that reads documents to be copied; an image signal processing unit 820 that handles processing of image data read from the documents and also handles overall processing of the copying machine; and an optical system 860 and an image forming system 870 to output the data read from the document.

In the upper section of the copying machine 10, an automatic document feeder (ADF) 850 is provided for feeding the documents and, if needed, reversing them upside down. On top of the copying machine 10, an operation panel OP is provided for instructing the operation modes of various image editing processes done on this copying machine 10 and the number of copies to be made.

In addition to the above, the copying machine is equipped with a finisher equipped with a binding device, a folding device, a punching device and a stapler as described below.

The control system that controls the operations of the entire copying machine (including the ADF and the finisher) comprises, as shown in FIG. 2, a CPU 910 to control the copying machine 10, a CPU 950 to control the ADF, and a CPU 980 to control the finisher. The CPUs include ROMs 911, 951 and 981 for the storage of programs and RAMs 912, 952 and 982 for various processing as working areas respectively.

The copying machine CPU 910 is connected to the control panel OP and the image signal processing unit 820. All the motions of various parts of the copying machine are controlled by instructions outputted from this copying machine CPU 910. The image processing unit 820 is also connected to a CCD sensor 816 via an A/D converter 821 and a laser source 862 for image generation via a D/A converter 831. The image signal processing unit 820 is provided with an image memory 825 for storing the image data read from the documents.

Details of the function and operation of each part of the copying machine 10 are explained below.

First of all, a document set on a document tray 815 of ADF 850 is conveyed to the desired position on a platen glass 818 one sheet at a time following the instruction of the ADF CPU 950. After having been read by the scanning system 810, the document will be discharged to a paper discharge tray on the ADF 850. Next, document conveyance system rollers 851, 852, 853 and 854 as well as a conveying belt 855 of the ADF 850 are driven to convey the document further.

During this document conveyance operation, the document size is detected from the ON/OFF timing of a sensor SE51 provided in the ADF 850. The signal from the sensor SE51 is transmitted to the copying machine CPU 910 via the ADF CPU 950 and will be used in preparing a document management table DT as explained later. The document management table DT is a data table to be used in editing images and generating printed output as explained later.

The scanning/reading of the document in the scanning system 10 is executed as: a scanner 819 moves underneath the platen glass 818 being driven by a scan motor (not shown); the document placed on the platen glass 818 is irradiated with light from the exposure lamp 811 attached to the scanner 819; and the reflected light is received by a CCD 816, which is a photoelectric conversion element.

The timings of the document conveying and the scanning drive of the scanner 819 of this scanning system 10 are controlled by the copying machine CPU 910.

The signal, after the photoelectric conversion by the CCD 816 of the scanning system 810, is converted by the A/D converter 821 into a digital signal so that it can be handled as a digital data. The digital signal thus obtained is entered into the image signal processing unit 820, where it goes through various picture quality compensations such as shading compensation, MTF compensation and gamma compensation. After the picture quality compensations, the image data is stored in the image memory 825 as the coded data. Various image editing such as image enlarging/reduction and rotation are conducted also in this image signal processing unit 820.

The image memory 825 is divided into multiple 32K byte memory regions as shown in FIG. 3A. Coded data are stored in each of these regions in order to make it possible to control reading and writing of the coded data simultaneously. The coded data are managed by the managing table MT prepared at the image signal processing unit 820.

The managing table MT stores, as shown in FIG. 3B, the region numbers of the image memory 825, page numbers, numbers of the connected regions, various support information required for compression/expansion processing such as the compression method, data length, etc. Such information is required for the management. The column "forward connection" in FIG. 3B indicates the forward connection of each 32K byte region and whether the particular region is the first region on the particular page; "00" here indicates that it is the first region, while a number other than that indicate the region number of the forward connection. Similarly, the column "backward connection" indicates the backward connection of each 32K byte region and whether the particular region is the last region on the particular page; "FF" here indicates that it is the last region, while a number other than that indicates the region number of the backward connection.

The processes such as image enlargement/reduction and image rotation are, as explained later, executed on the coded data read from the image memory 825 of the image signal processing unit 820 based on the instructions of the document management table DT.

The image data that has been treated with image quality correction as well as necessary image processing and editing at the image signal processing unit 820 is outputted from the image signal processing unit 820 based on the instructions of the copying machine CPU 910. This output image data is then converted into an analog data by means of the D/A converter 831. The semiconductor laser 862 included in the optical system 860 is driven by this analog data. The laser beam thus generated forms an image on the paper, and the image will then be printed out by means of a developing/transferring system 871 of the image forming system 870.

The optical system 860 comprises the semiconductor laser 862, a polygon mirror 865 that changes a direction of laser beam and a reflecting mirror 867. The image forming system 870 comprises the developing/transferring system 871, a conveyance system 872 that conveys the paper and a fixing system 873 that fixes the image. The developing/transferring system 871 comprises a photosensitive drum 871a, an electrostatic charger 871b, a toner unit 871c that stores toner and provide the toner onto the photosensitive drum, a transfer charger (not shown) that transfers the toner image on the photosensitive drum onto the paper, a separation charger (not shown) that separates the paper and the photosensitive drum, and a cleaning plate (not shown) that removes residual or unnecessary toner.

A conveyance system 880 consists of cassettes 881 and 882 that store paper, a paper guide 883, and a timing roller 884. The size of the paper stored in the paper cassette 881 or 882 depends on which paper cassette it is stored. Therefore the paper size can be determined from the paper cassette used. Although only two cassettes are shown here, more cassettes can be used without affecting the gist of the invention.

The fixing system 873 comprises a fixing roller 874 that conveys the paper under heat and pressure, a discharging roller 875, and a discharging sensor (not shown) that detects discharging of the paper.

The printed paper is sent out from a discharging port 10b to a finisher 1, which will be discussed later.

Figure 4:
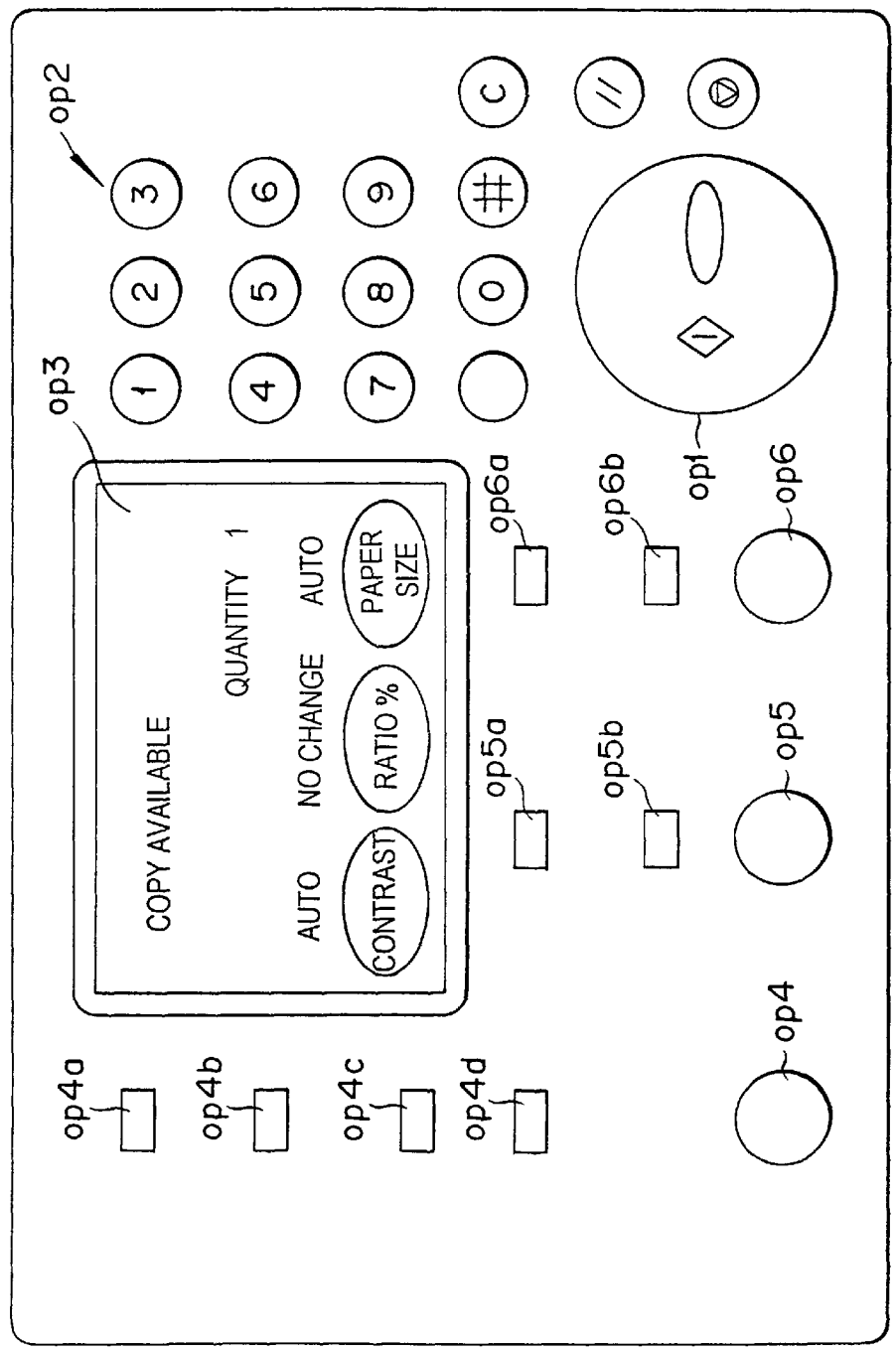
FIG. 4 is a view illustrating one example of the control panel used on the copying machine.

The control panel OP provided in this copying machine 10, as shown in FIG. 4, comprises: a print key op1 for instructing the start of copying operation; a ten key pad op2 for entering the number copies to be made; a liquid crystal display panel op3 for displaying messages; a binding selection key op4 for displaying the binding format of the copied paper; display lamps op4a, op4b, op4c and op4d for displaying the status of the binding select key op4; a folding selection key op5 for instructing the method of paper folding; and display lamps op5a and op5b for displaying status of folding select key op5, process selection key op6 for instructing stapling and punching, and their display lamps op6a and op6b.

The control panel OP is controlled by the copying machine CPU 910. The CPU 910 makes judgment on input from operating keys, executes each process, and generates various process status and message displays on the display panel op3.

<<GENERAL CONSTITUTION OF FINISHER>>

As shown in FIG. 1, the finisher 1 roughly comprises: a non-sorting tray 11a and paper holding unit 11b for accumulating and aligning the paper P discharged from the discharge port 10b of the copying machine 10; a folding device 2 that doubles the paper P discharged form the discharge port 10b, creases the paper P for saddle stitching or folds the paper P in three in a Z-shape (hereinafter called "Z-fold") as needed; a stapler 3 that is installed on the paper conveyance down stream-side of the paper holding unit 11b for stapling the stacked and aligned paper P; a paper holding unit 4 for holding the stapled and discharged sheaf of papers; a binding device 5 that attaches the cover to the stapled paper or the unstapled paper; and a punching device 7 provided in the paper conveyance passage for punching holes in the paper as needed. The paper discharged from the copying machine 10 is conveyed to various units or devices in the finisher by means of a paper conveying unit 6.

<<PAPER CONVEYING UNIT>>

As shown in FIG. 1, the paper conveying unit 6 comprises: a conveyance passage 61 for receiving the paper P from the discharge port 10b of the copying machine 10 and conveying it downward; a switchback conveyance passage 62 for reversing the forward/backward and front/back sides of the paper P; a conveyance passage 63 for conveying the paper P to non-sort tray 11a; a conveyance passage 64 for conveying the paper P branching off from the conveyance passage 63 to the paper holding unit 11b; a conveyance passage 65 for conveying the paper P branching off from the passage 63 almost at the very beginning thereof, to the binding device 5 or the sorting unit 4; and a conveyance passage 66 for conveying a sheaf of papers from the paper holding unit 11b to the sorting unit 4 or the binding device 5. The paper P is conveyed through each of these passages aligned with the center of each passage.

Figure 5:
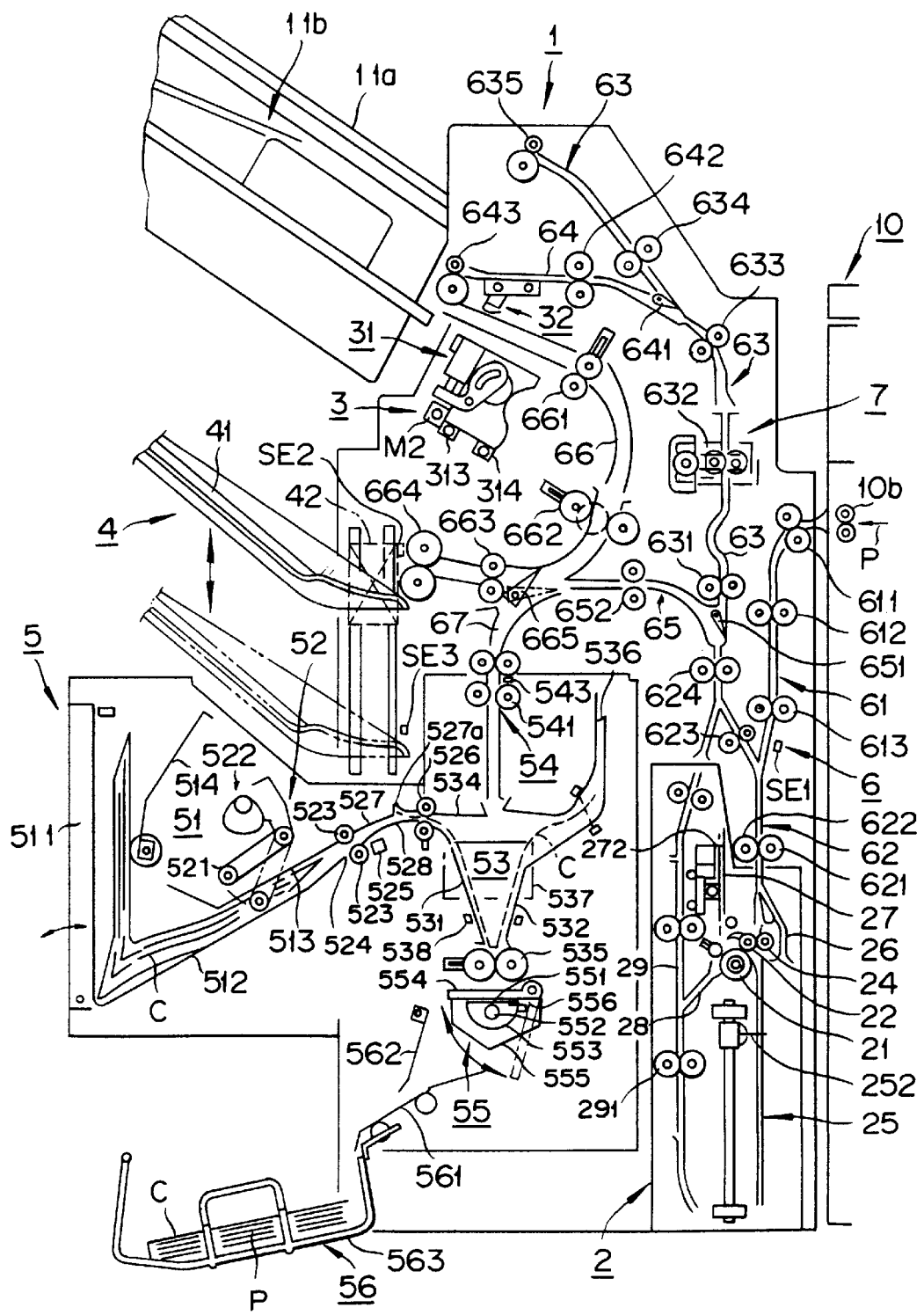
FIG. 5 is a view illustrating the construction of the finisher.

More specifically, the passage 61 comprises conveying rollers 611, 612 and 613 as shown in FIG. 5. The switchback conveyance passage 62 comprises: a conveying roller 621, which is capable of reversing its rotation; a driven roller 622, which is in contact with and driven by the conveying roller 621; conveying roller pairs 623 and 624 for conveying the paper P to the directions of conveyance passages 63, 64 and 65; and a sensor SE1 for detecting the paper.

The paper P that has been conveyed downward along the conveyance passage 61, is led into the switchback conveyance passage 62. If there will be no folding to be done, when a desired time has passed after the back edge of the paper P was detected by the sensor SE1, i.e., the back edge of the paper P has gone into the conveyance passage 62, the conveying roller 621 reverses its rotation to convey the paper P from the switchback conveyance passage 62 to the conveyance passage 63 upward.

The conveyance passage 63 comprises conveying roller pairs 631, 632, 633 and 634, and a discharge roller pair 635. At this time, if there is an instruction for punching holes at the leading edge or trailing edge of the paper P, the holes are punched by the punching device 7.

The conveyance passage 64 is provided with a switching pawl 641 for switching the conveying direction of the paper P, a conveying roller pair 642 and a discharge roller pair 643. The conveyance passage 64 is used for discharging the paper P to the non-sorting tray 11a or to the paper holding unit 11b.

The conveyance passage 65 is provided with a switching pawl 651 for switching the conveying direction of the paper P, and a conveying roller pair 652.

The conveyance passage 65 is used for guiding the paper P not to the paper holding unit but directly to the binding device 5 or to the sorting unit 4.

The switching pawls 641 and 651 are turned by solenoids respectively, which are not shown here. As a result, the paper P conveyed from the switchback conveyance passage 62 will be guided either to the conveyance passage 63 or 65 with the help of the switching pawl 651.

The paper P, after stacked and aligned in the holding unit 11b, will be guided to the sorting unit 4 via the conveyance passage 66. The conveyance passage 66 is provided with multiple pairs of distance-adjustable rollers 661, 662 and 663, and a pair of discharge rollers 664.

<<PAPER HOLDING UNIT>>

The sorting unit 4 comprises a sorting tray 41 and a drive mechanism 42 that moves the tray 41 up and down as shown in FIG. 5. During a copying operation of a large volume, the sorting tray 41 receives the paper P one sheet at a time via the conveyance passage 65, or stapled sheaf through the conveyance passage 66, after the sheaf has been sent from the paper holding unit 11b to the stapler 3, where they are stapled. The paper P or the sheaf of papers received from the conveyance passages 65 or 66 are guided to the tray 41 or to the binding device by a switching pawl 665.

Each time a sensor SE2 detects the passage of the paper P to be received and stacked on the tray 41, the tray 41 is lowered a fixed distance by the drive mechanism 42. When a sensor SE3 detects that the tray 41 has reached its lower limit, it means that the tray 41 is full, so that the copying operation is interrupted. As the drive mechanism 42 that lowers the tray 41 a fixed distance at a time is well known so that the explanation here is skipped.

<<FOLDING DEVICE>>

Figure 6:
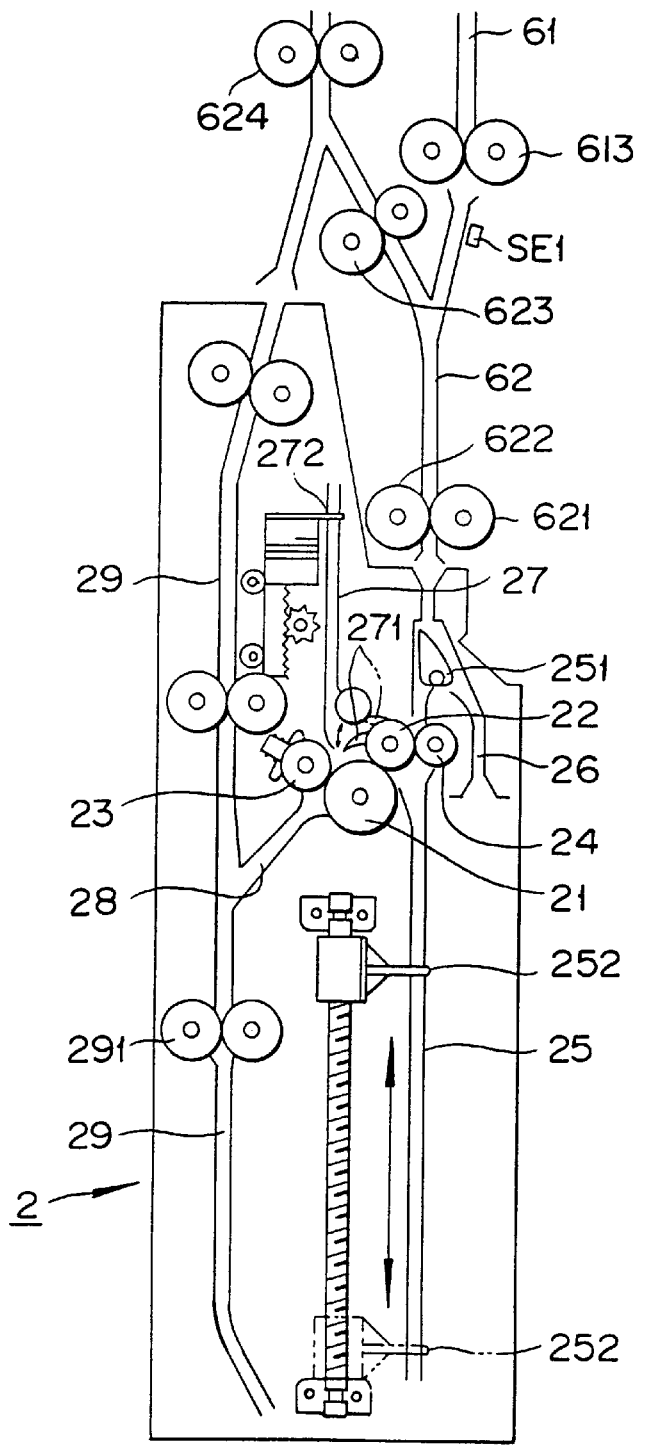
FIG. 6 a view illustrating the construction of the folding device provided on the finisher.

The folding device 2 is provided directly beneath the paper conveying unit 6 as shown in FIG. 1 and FIG. 6. The folding device 2 is capable of folding the paper P, on which the image has been formed, in half at its center of the conveying direction; making a crease in the center by opening the paper P, which has been folded in half; or in three in a zigzag shape (Z-fold).

The components, which play the major role in the folding device 2, are three reversing folding rollers 21, 22 and 23, and a backup roller 24. The paper P is delivered/received by means of these rollers 21 through 24 and multiple paper conveyance passages 25 through 29.

Next, let us explain about the paper folding process. The folding device 2 has three folding modes that can be selectable from the control panel OP of the copying machine 10.

Z-FOLD MODE

This mode is used to fold the paper into a zigzag shape and is executed as follows: First of all, the paper P sent from the discharge port 10b via the conveyance passages 61 and 62 is conveyed toward the first conveyance passage 25 by means of the switchback roller pair 621, as shown in FIG. 6, and passes through a switching device 251. The paper P is forced to stop temporarily due to a stopped folding roller 22 and a backup roller 24. The paper P then will be conveyed when the folding roller 22 starts to rotate again until it abuts against a stopper 252 in position. When it abuts against the stopper 252, the paper P forms a loop in the vicinity of the folding rollers 21 and 22. This loop will then be nipped by the folding rollers 21 and 22 to produce the first folding.

After the first folding is completed, the paper P will be conveyed to the second conveyance passage 27 by means of the switching action of a switching device 271 based on the Z-folding instruction from the copying machine 10. The paper P is then forced to stop as it abuts against the stopper 272 and forms a second loop near the nip point between the folding rollers 21 and 23. This loop will then be nipped by the folding rollers 21 and 23 to produce the second folding. When the second folding is completed, the Z-folded paper P is conveyed to the third conveyance passage 28. The paper P is then conveyed to the switchback conveyance passage 29. The paper P will then be conveyed towards the conveyance passage 63 by means of the reversed rotation of the switchback roller pair 291.

DOUBLE FOLD MODE

This mode is to fold the paper P in half at the center line. In this mode, the first fold is made in the same way as in the Z-fold mode except that the position of the first stopper 252 is different. The switching device 271 provided at the entrance of the second transfer passage 27 is not turned in the direction to guide the paper P to the second conveyance passage 27. Therefore, the paper P, after the first folding is completed, is directly conveyed to the nipping point between the folding rollers 21 and 23. In other words, immediately after the paper P passes through the folding rollers 21 and 22, it will be picked up by the nip point between the folding rollers 21 and 23. The paper P is conveyed to the third conveyance passage 28, and then onto the switchback conveyance passage 29. The paper P is turned upside down by means of the switchback roller pair 291, similar to the case of the Z-fold, and conveyed to the conveyance passage 63.

<<SADDLE STITCH MODE>>

This mode is used to produce a crease at the centerline of the paper P as a preparation for staple binding as in the case of weekly magazines. The paper P supplied from the discharge port 10b is conveyed to the first stopper 252 located in the first conveyance passage 25 to make a fold in half at the center in correspondence with the size of the paper P. Abutting the stopper, the paper P will form a loop. This loop will then be picked up by the nip point between the folding rollers 21 and 22 for the first folding. In the meantime, the conveyance of the paper P is continued toward the downstream direction until the timer counts up the desired time. The timer started counting when the sensor SE1 placed at an upstream position detected the back end of the paper P. When the desired time is up, the folding rollers 21 and 22 as well as the switchback roller pair 621, which have been running to convey the paper P downstream, reverse their directions. As a result, the folded area of the paper P will be released from the nip between the folding rollers 21 and 22, and the folded paper P will spread by itself. Then, the creased paper P will again be conveyed upstream led by the edge that used to be the trailing edge as a result of the switchback. The paper P will be conveyed to the paper holding unit lib via the conveyance passage 64.

<<STAPLER>>

Figure 7:
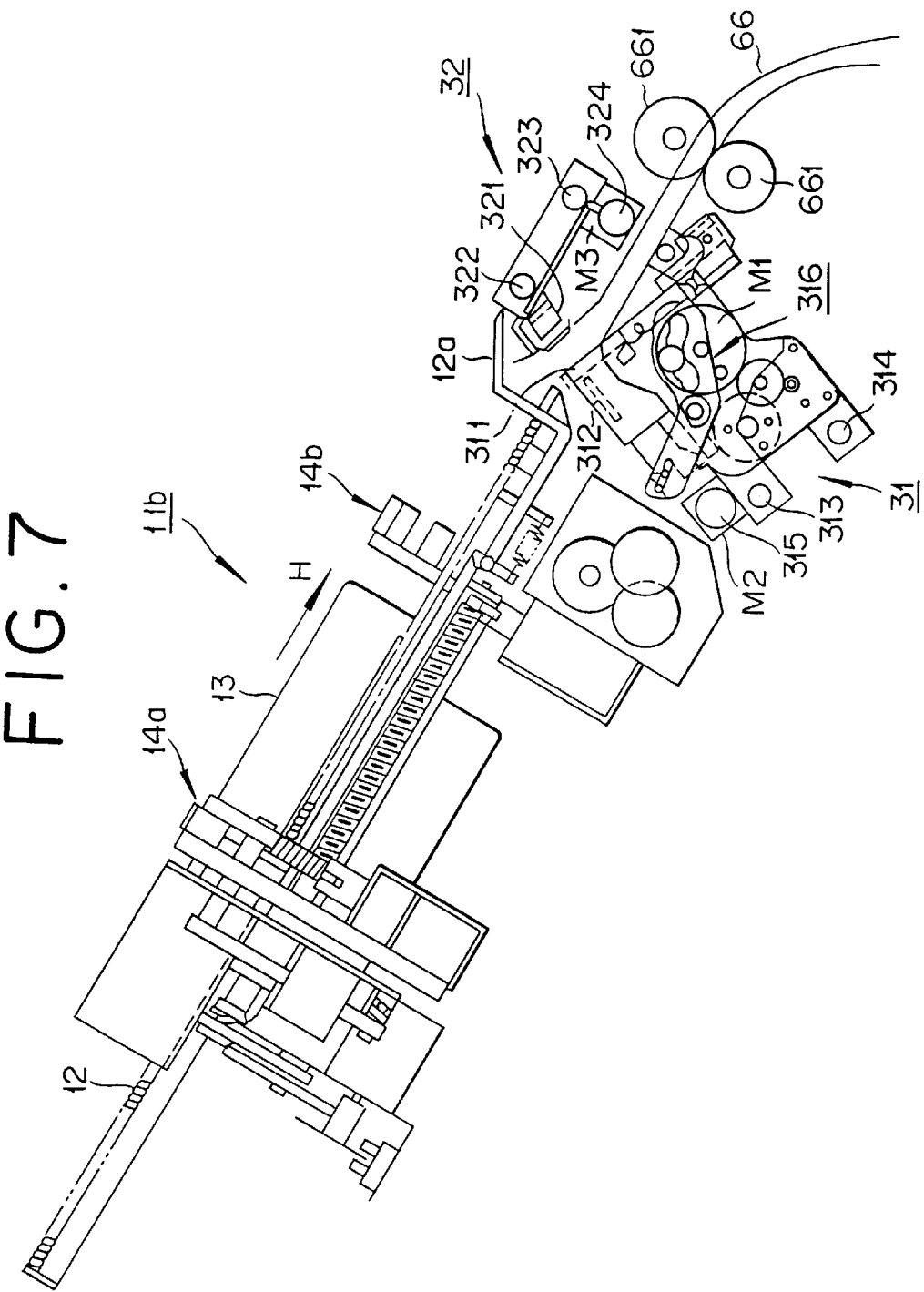
FIG. 7 is a view illustrating the construction of a stapler provided on the finisher.

The stapler 3 is used to apply staples to the desired positions of the sheaf of papers, as shown in FIGS. 5 and 7, after the paper P is discharged from the conveyance passage 64 and aligning process in the paper holding unit 11b. The stapler 3 comprises a stapling unit 31 that drives staples and a staple receiver 32 that receives and bends the staples being driven.

In the paper holding unit 11b, a leading edge stopper 12a receives and aligns the leading edge (trailing edge in the direction of discharge into the tray 12) of the paper P discharged on the tray 12, and a side aligning plate 13 moves back and forth in the direction perpendicular to the conveying direction to align the side direction of the paper P. A first chucking mechanism 14a and a second chucking mechanism 14b grips the side of the paper P reciprocally to suppress the undesirable rising of the paper P, and the first chucking mechanism 14a also grips the sheaf of the papers to send it out towards the stapler 3. The suppression of the rising of the paper P increases the loading of the tray 12 and is effective in holding the paper doubled or Z-folded in the folding device 2.

The stapling unit 31 drives a staple separating/bending device 312 via a cam link mechanism 316, which is driven by a motor M1. The stapling unit 31 cuts and separates individual staples from a staple cartridge 311, bend them into the "• ¬"-shape, and cause them to protrude towards the staple receiver 32. The staple receiver 32 comprises a receiving base 321 that bends a staple to tie a sheaf of papers.

The driving position of the staple in the direction perpendicular to the paper conveying direction H is adjustable by means of the forward/reverse rotation of a spiral axis 315. The stapling unit 31 is connected to the spiral axis 315 through two guide shafts 313 and 314 to be able to slide freely in the direction perpendicular to the paper conveying direction H, while the spiral axis 315 is driven by a stepping motor M2. The staple receiving unit 32 is positioned driven by the forward/reverse rotation of the spiral axis 324 in the direction perpendicular to the paper conveying direction H. The staple receiver 32 is connected to the spiral axis 324 through two guide shafts 322 and 323 to be able to slide freely, and the spiral axis 324 is driven by a stepping motor M3. The stapling position in the paper conveying direction is controlled by the motion of the chucking mechanism 14a.

After stapling, the paper P is gripped and conveyed by the distance-adjustable pair of conveying rollers 661 along the conveyance passage 66.

Since the construction and operation of such a stapler is publicly known (e.g., U.S. patent application Ser. No. 08/821,444), further details are omitted here.

<<BINDING DEVICE>>

Figure 8:
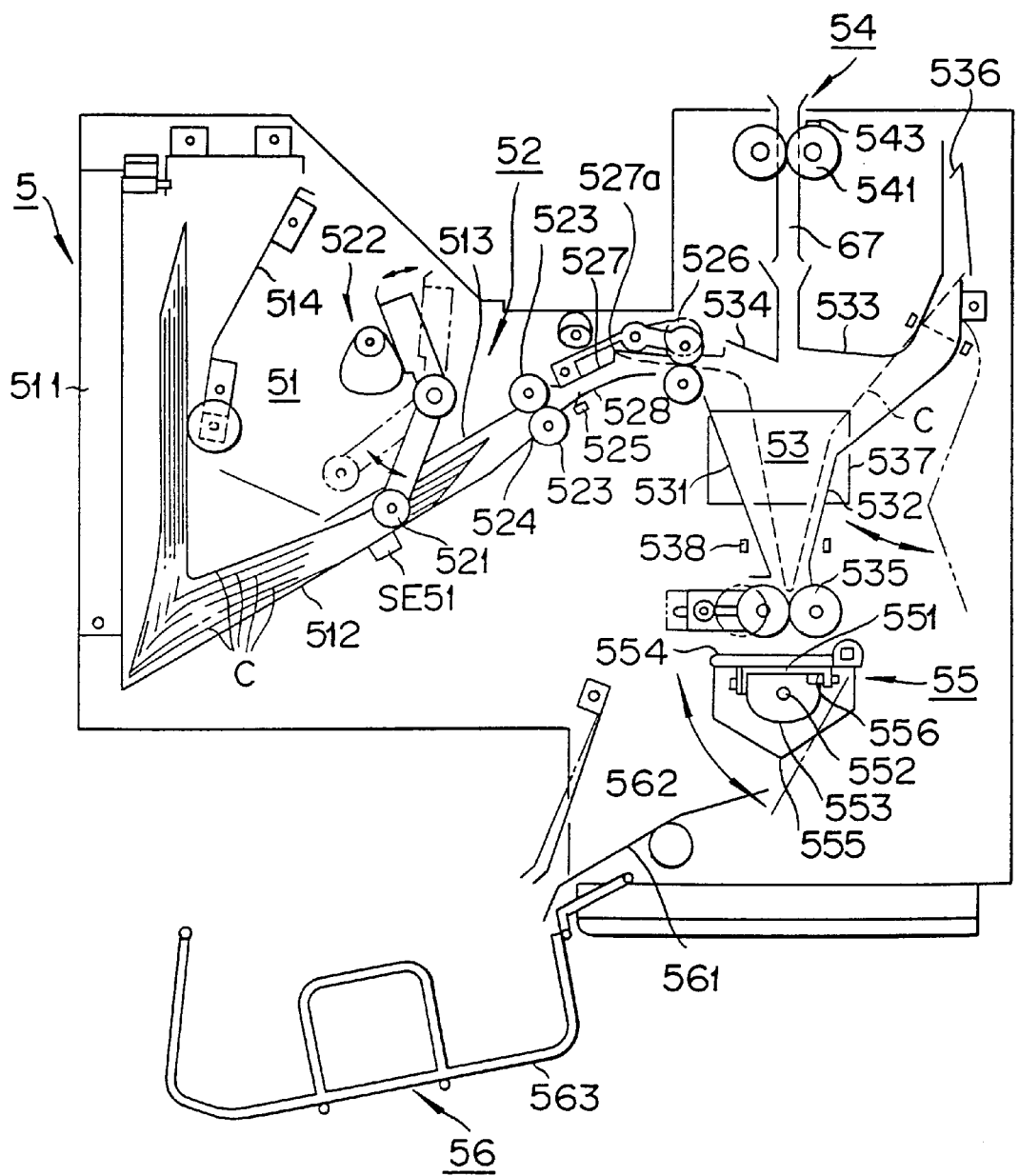
FIG. 8 is a view illustrating the construction of the binding device provided on the finisher.

The binding device 5 is to glue the paper after coping in a bundle using a cover available from the market. The binding device 5, as shown in FIGS. 5 and 8, comprises: a cover holding unit 51 for holding multiple covers for binding purpose available from the market; a cover conveying unit 52 for taking out a piece of cover C from the cover holding unit 51; a paper insertion unit 53 for holding the cover C conveyed by the cover conveying unit 52 in a paper receiving condition; a paper conveying unit 54 for inserting into the cover C a sheaf of papers that has been conveyed through a conveyance passage 67 after having been discharged from the discharge port 10b; a heating unit 55 for heat-treating the cover C to which the paper P has been inserted at the paper insertion unit 53; and a discharging unit 56 for discharging the cover C after binding to the outside of the binding device and holding that.

The sheaf of papers aligned in the paper holding unit 11b is sent directly, or after stapling, to the binding device 5 via conveyance passages 66 and 67 to be bound. As an alternative, the paper can be folded in the folding device and sent, sheet by sheet, through the conveyance passage 65 to the binding device 5 to be bound there.

The cover holding unit 51 has a space provided for holding the covers C, the space comprising a door 511, a cover holding device 514, and lower guides 512 and 513. The supply of the covers C is executed by placing back covers on the lower guide 512 while opening the door 511 and maintaining a group of covers in an opened condition (the condition shown in FIG. 3), and placing front covers to abut against the cover holding device 514 and the lower guide 513 to hold them in a V-shape.

The cover conveying unit 52 comprises: a pickup roller 521 that abuts against the back cover surface of the stored covers C and conveys the covers C picking up at the leading edge thereof; a roller contacting device 522 for pressing the pickup roller 521 against the covers C; a separating roller pair 523 for separating and conveying the covers C one sheet at a time; a front separating device 524 to be placed in the upstream of the separating roller pair 523; a cover detector 525 to be placed in the downstream of the separating roller pair 523; a conveying roller pair 526 to be placed in the downstream of the separating roller pair 523; and conveying guides 527 and 528 constituted in such a way as to connect the cover holding unit 51 and the paper insertion unit 53.

The paper insertion unit 53 comprises: guide plates 531, 532, 533 and 534 forming a reversed triangular-shaped insertion space; a resist roller pair 535 to be placed in the lower part of the insertion space; a stopper 536 to be placed in the upper (in the cover conveying direction) part of the insertion space; and a side aligning device 537 to be placed in the insertion space above the resist roller pair 535.

The cover C is supplied by the cover conveying unit 52, moving upward along the conveyance guide 527 and 528, until its leading edge abuts against the leading edge stopper 536. The cover C continues to be conveyed after that, so that the spine of the cover bends downward and passes through the gap between the guide plates 531 and 532, while its bottom edge is restricted by the resist roller pair 535.

When a desired time passes after the passage of the cover back is detected by the cover detector 538, which is provided above the resist roller pair 535 (while the cover back is abutting against the resist roller pair 535 and the trailing edge of the cover is on the upstream side of the conveying roller pair 526), at least the upper roller of the conveying roller pair 526 retreats to the outside of the cover conveyance passage.

Due to the retreat of the conveying rollers 526, the trailing edge of the front cover of the cover C engages, due to its resilience, with a recess 527a of the conveyance guide 527. As a result, the trailing edge of the cover C is restrained.

As shown with a short dashes line in FIG. 8, the inside of the cover abuts against the guide 533 and 534, the outside of the cover abuts against the covers 531 and 532, etc., and the back rests on the resist roller pair 535. In other words, the cover C is set in the paper insertion unit 53 in a V-shape.

After the cover is set in the paper insertion unit 53, the side aligning device 537 is moved in the direction perpendicular to the cover conveying direction. The position of the cover is restrained as its edge is pressed against the aligning base plate (not shown), which is provided facing against the side aligning device 537.

The paper conveying unit 54 comprises: a conveying roller pair 541 placed in the conveyance passage 67, which extends above the resist roller pair 535, for conveying the sheaf to the paper insertion unit 53; and a detector 543 for detecting the paper P in the conveyance passage 67. The paper conveying unit 54 is so designed that the sheaf conveyed by the conveying roller pair 541 drops by its own weight into the cover C opened upward in the paper insertion unit 53. This dropping of the sheaf by its own weight causes its edge aligned by itself in preparation for gluing.

The heating unit 55 comprises: a heating plate 551 for heating the spine of the cover C that has been conveyed from the paper insertion unit 53; a heater 552 placed under the heating plate 551; a reflecting plate 553 that is formed to surround the lower portion of the heater 552 so that the heat from the heater 552 can be concentrated on the heater plate 551; a heater support plate 554 that holds the heater plate 551, the heater 552 and the reflecting plate 553 together; a heat insulating shield 555 attached to the heater support plate 554 for its protection; and a temperature detector 556.

When the sheaf of papers is inserted into the cover C in the paper insertion unit 53, the conveying roller pair 526 presses the edge of the cover C, after which at least one of the rollers of the resist roller pair 535 retreats to the outside of the insertion space. At this point, the resist roller pair 535 and the conveying roller pair 526 are rotated in the forward direction to send the cover C and the sheaf to the heating unit 55 located under the paper insertion unit 53. Next, the conveying roller pair 526 and the resist roller pair 535 are stopped, the rollers of the conveying roller pair 526 are separated, and the cover C and the sheaf are pressed together by means of the resist roller pair 535. With these actions, the alignment of the edge of the sheaf in the cover C is further improved.

After the above alignment operation, the spine of the cover placed on the heating plate 551 is heated at a proper temperature for a certain period while keeping the cover C and the sheaf pressed together by means of the resist roller pair 535. This will melt the adhesive applied to the spine of the cover and glue the cover C to the sheaf of papers. After the cover C and the sheaf have been given a sufficient time to be glued together completely, the resist roller pair 535 is run in the forward direction to discharge the glued product.

The discharge unit 56 comprises a discharge guide 561, a closing plate 562 and a discharge tray 563. The cover C conveyed from the heating unit 55 slides down the discharge guide 561 by its own weight, and is collected by a discharge tray 563.

A problem with a finisher having a construction as described above, when it is connected with a copying machine, is its ease of operation. For example, a copying machine has to deal with various sizes of documents. Moreover, a finisher normally uses covers that are available off-the-shelf on the market and also are designed exclusively for the purpose of binding standard size paper, such as A4 and B5 size paper. Consequently, if various sizes of paper are used to match the sizes of the original documents so that they can be copied to the same sizes, the resultant binding of various sizes of paper may not only look bad, but also the paper holding property may become weakened. On the other hand, instructing the copying machine to reduce or enlarge the copy depending on the size of the document and the cover is cumbersome and results in poor operating easiness. Moreover, reduction copying may cause poor legibility.

To over come these problems, the following image processing technique is used present embodiment:

<<IMAGE EDIT PROCESSING>>

The following is the description of the image editing process used in the binding after copying (hereinafter called "bind-copy"). For the sake of simplicity, let us assume that the cover C stocked in the binding device is the one that is designed exclusively for A4 size paper. As described before, the present embodiment uses a cover that is available off-the-shelf on the market. It goes without saying that the invention can be embodied using either A4, B5 or any other standard paper size.

Figure 9:
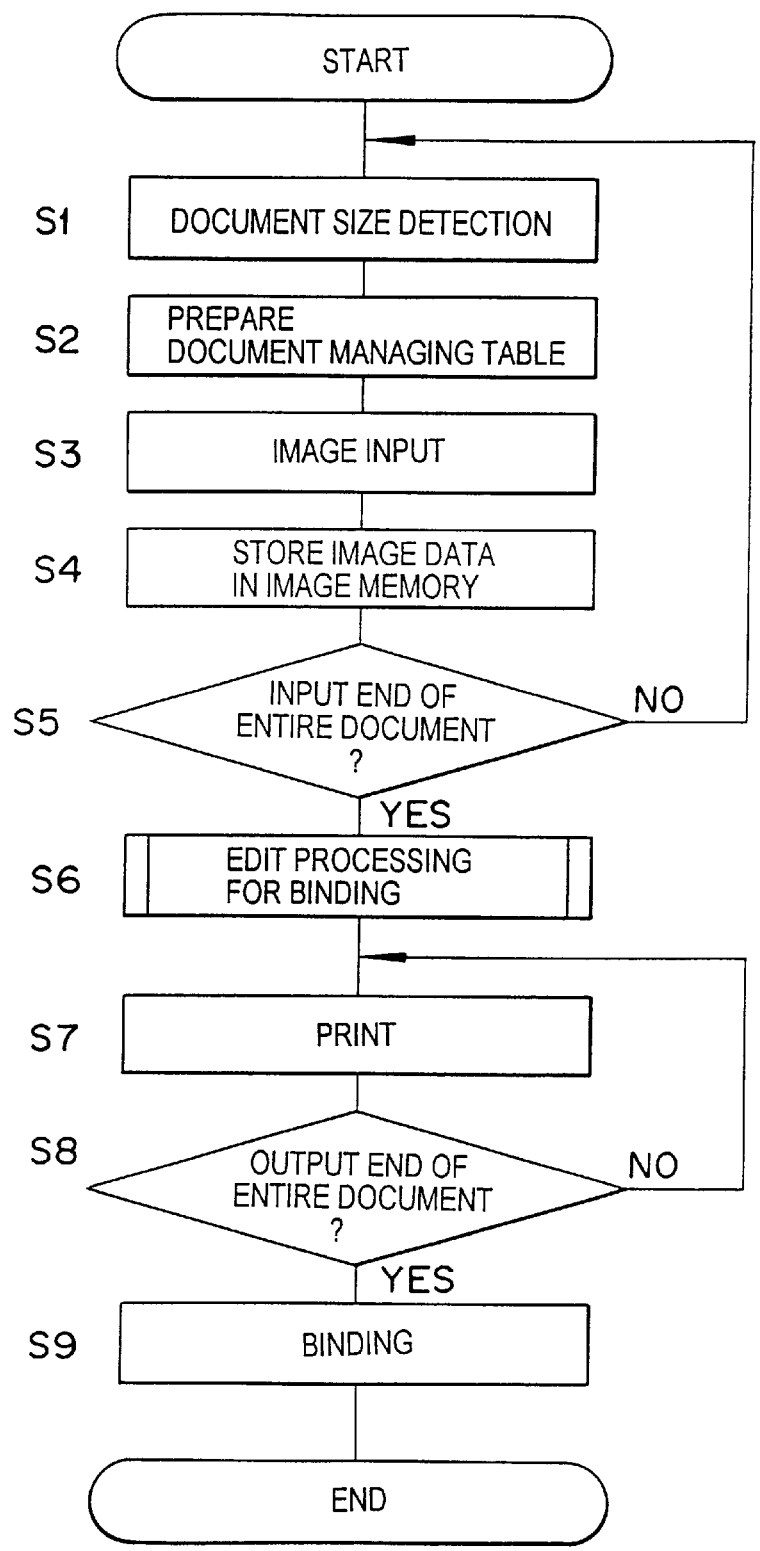
FIG. 9 is a main flowchart to show image processing steps taken in bind copying on the copying machine.

FIG. 9 is the main flowchart of the bind-copy operation. When the first page is conveyed from the document set to ADF 850, the document size detection is conducted (S1). The document size information thus obtained is transmitted from the ADF CPU 950 to the copying machine CPU 910. The CPU 910 generates the document management table DT from the detected document size as shown in FIG. 15A, and stores the document size (the main-scanning direction and the sub-scanning direction) information for each page (S2). Next, the image is scanned and the image data is entered (S3). The input image data is stored in the image memory 825 (S4). The above operations S1 through S5 are executed for the entire document set on the ADF 850 (S5).

The image data stored in the image memory 825 will now be edited for binding (S6). This bind-editing, which will be discussed in detail later, is to decide the necessary output instructions such as reduction or enlargement of the image data, the Z-fold mode, etc., when the document size is different from the standard size (A4 size) cover.

Next, based on the output instructions, the print out is made on the paper (S7). Then, whether the entire documents has been printed is checked (S8). Upon confirmation of the completion of the printing, the printed paper will be bound with the cover in the aforementioned binding device 5 (S9).

Figure 10:
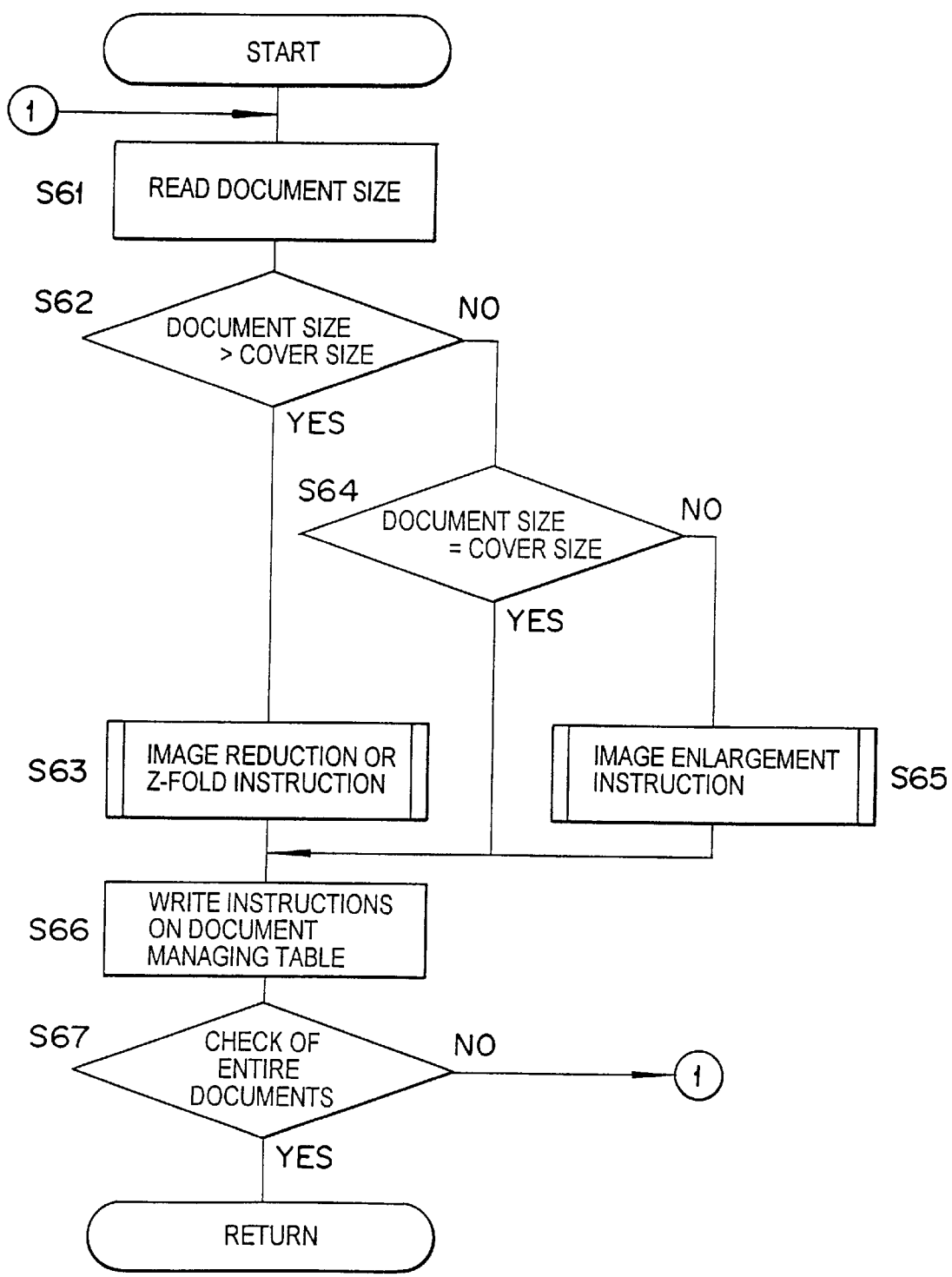
FIG. 10 is a flowchart of a bind editing process shown as a part of the main flowchart.

FIG. 10 is a flowchart to show the steps of the bind-editing. First of all, the copying machine CPU 950 reads the document size from the document management table DT (S61). It then compares the document size and the cover size (A4 in this case) (S62). If the document size is larger, either for the size reduction instruction or the Z-folding instruction will be outputted (S63). In the step S62, if the document size is determined to be not larger than the cover size, it is then determined whether the document size is equal to the cover size or not (S64), and return to the main routine if the two sizes are found to be equal. On the other hand, if the document size is not equal to the cover size (the document size is smaller than the cover size), the image enlargement instruction, which will be described later, will be executed (S65). Each instruction will be written on the instruction column on the document management table (S66). All the above processes shall be conducted the entire document (S67).

Figure 11:
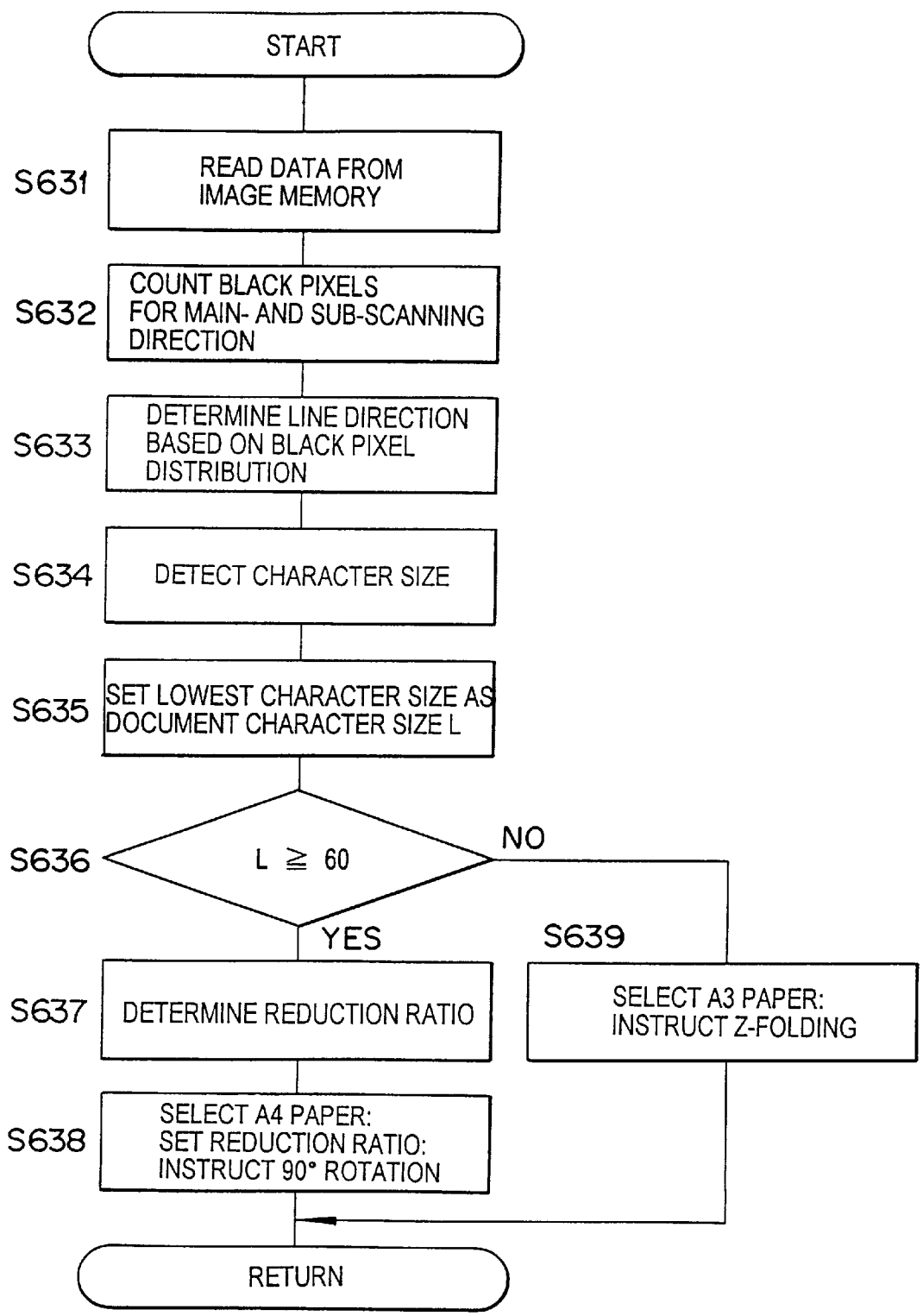
FIG. 11 is a flowchart of an image size reduction or Z-folding instruction indicated in the bind editing process routine.

FIG. 11 is a flowchart to show the steps of the image reduction and Z-folding instructions. First of all, the copying machine CPU 950 reads the data for one page from the image memory 825 (S631) and counts the number of black pixels for the main- and sub-scanning direction (S632). Next, based on the pixel distribution for each line in the main- and sub-scanning directions, it is determined whether the texts are written vertically or horizontally (S633). This is done for the purpose of determining the height (or width) of the characters, which will be described later.

To explain the above procedure in more detail, when the image data is read from the image memory 825 in the step S631, each pixel of the data of the main-scanning direction and the sub-scanning direction is checked pixel by pixel whether it is a black pixel or not (whether the data is "0" or "1") to obtain the total count of black pixels (data "1") (S632). By determining the black pixel count distribution for each scanning line as above, it can be determined whether the document is of vertical writing or of horizontal writing. In case of a document with horizontal writing, the distribution of black pixel count is denser in the main-scanning direction than in the sub-scanning direction as one can see in the histograms shown in FIG. 12A. It is thus obvious that the writing is parallel to the main-scanning direction, i.e., the writing is horizontal. Similarly, in case of a document with vertical writing, the distribution of black pixel count is denser in the sub-scanning direction than in the main-scanning direction as one can see in the histograms shown in FIG. 12B. It is thus obvious that the writing is parallel to the sub-scanning direction.

Figure 13B:
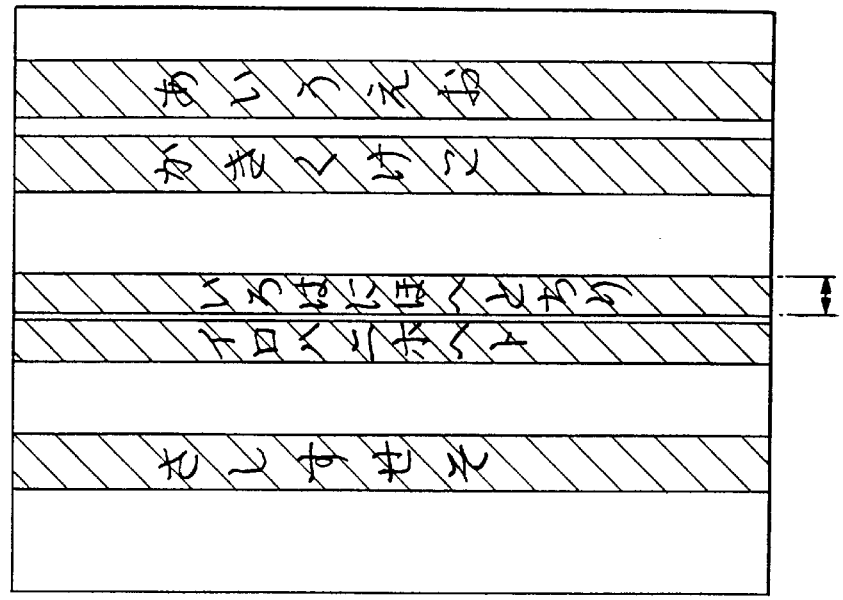
FIG. 13 is an explanatory drawing illustrating operations for identifying font sizes in a document image.
Figure 13A:
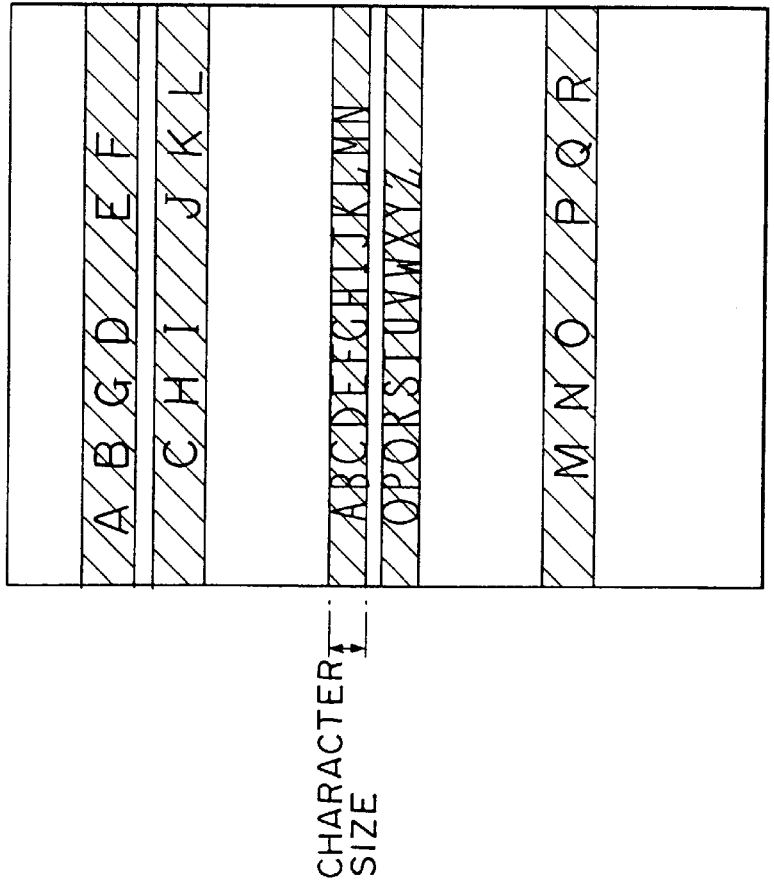

Next, rows and columns are cut out as shown in FIGS. 13A and 13B to detect the width of each text line as the size of the characters (S634). The character size is determined as the height of the row from the pixel count per each row in case of the horizontal text. The character size in case of the vertical text is determined from the width of the column. The lowest character size is extracted as the character size L (S635).

Next, let us determine whether the extracted character size L is less than 60 pixels (S636). The reason why a character size L is less than 60 pixels is as follows: In the present embodiment, we assumed that the cover size is for A4 size paper. Also, we know that the largest document size that can be copied is A3 in most copying machines on the market. In other words, the largest reduction ratio occurs when an A3 size document is reduced to A4 size. As a rule of thumb, 60 pixel count is used here as the threshold of legibility in such a case. Therefore, although 60 pixel count is chosen as the threshold in this embodiment, a different pixel count can be established as the legibility threshold in correspondence with the maximum reduction ratio for a copying machine capable of copying a larger document.

If the character size L is determined to be equal or larger than 60 pixels in the step S636, the reduction ratio will be determined (S637). Under a normal circumstance, the size of the document to be reduced is either A3 or B4. The reduction ratio is 71% in case of reduction from A3 to A4 and 82% from B4 to A4. The reduction ratio is determined by reading the original document data from the document management table DT. In case of a size other than the JIS standard sizes, the long side and the short side of the document to be copied are compared to the long side (297 mm) and the short side (210 mm) of the A4 size respectively. The larger ratio of the two comparisons is selected as the set value. Next, the A4 paper is selected as the output paper to generate the image reduction instruction at the determined reduction ratio and the 90° rotation (S638). When the above process is completed, return to the bind-copy routine, where these instructions will be written into the document management table DT (S66).

If the character size L is determined to be less than 60 pixels, i.e., a proper legibility of the characters can not be maintained due to reduction, the A3 paper will be selected as the output paper and the Z-fold mode will be instructed (S639). Next, the program will return to the bind-edit routine, where these instructions will be written on the document management table DT (S66). This completes the generation of the image reduction and Z-folding instructions.

Figure 14:
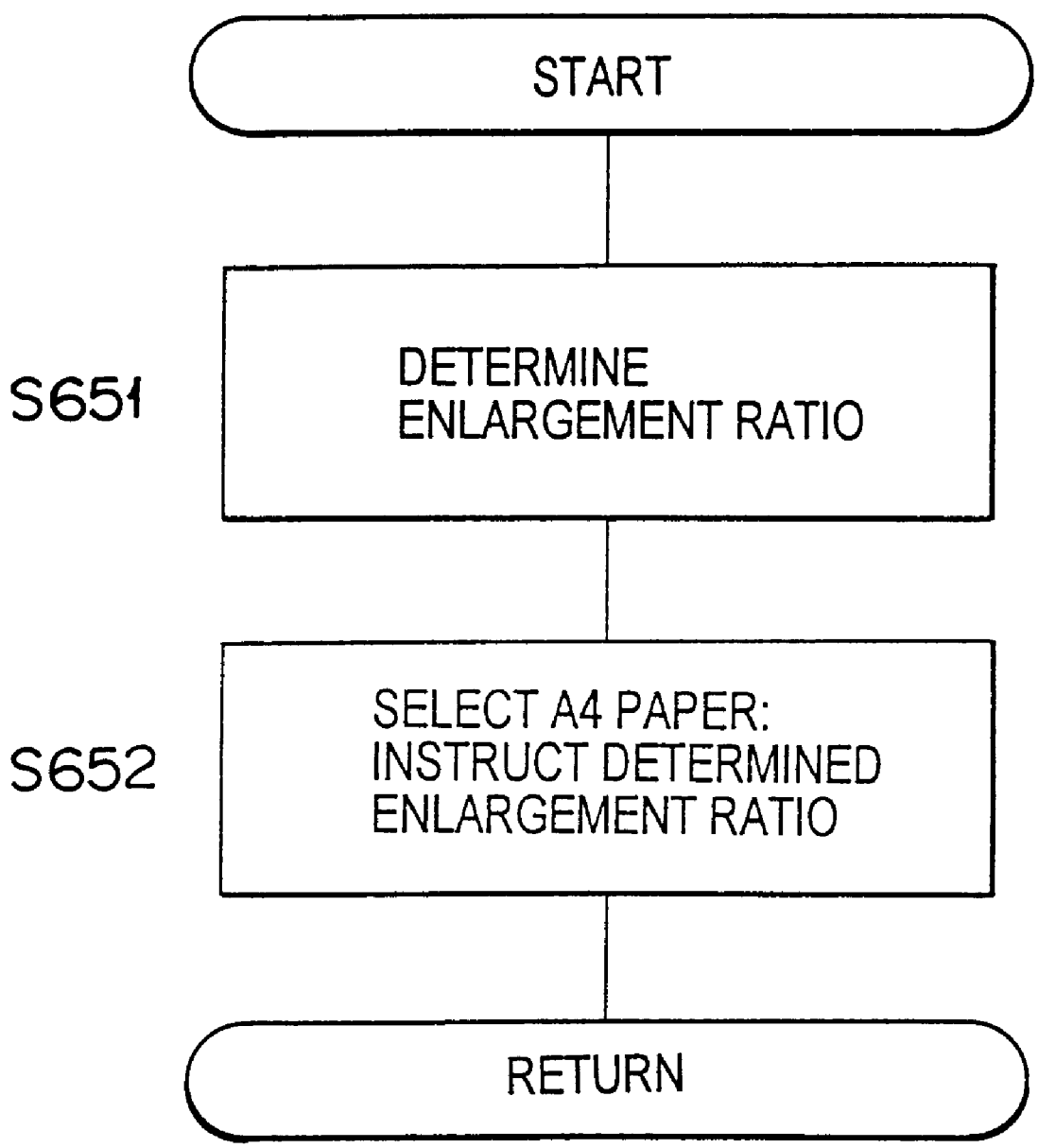
FIG. 14 is a flowchart of an image size enlarging instruction indicated in the bind editing process routine.

If the document size is found to be different from the cover size in the step S64 of the bind-edit routine, i.e., the document size is smaller than the cover size, an image enlargement instruction will be executed (S65). The enlargement ratio will be determined as shown in FIG. 14 (S651), the A4 paper is selected as the output paper, and the image enlargement instruction at the determined enlargement ratio will be outputted (S652). These instructions will also be written on the document management table DT (S66).

The document management table written with those process instructions is shown in FIG. 15B. The print output will be executed according to the instructions of the document management table DT (S7). The copying machine CPU reads the instructions of the document table DT and, for those pages with no specific instructions (pages 1, 2), the documents will be printed out in the same size as the original. For those pages with instructions for the selection of paper size, enlargement/reduction ratio and rotation (pages 3, 4, 5), the documents will be printed out enlarged, reduce or rotated according to those instructions. As to the pages where there are Z-folding instructions, the folding instructions will be outputted from the copying machine CPU 910 to the finisher CPU 980. As a result, the folding device 2 becomes active according to the instructions to execute the Z-folding.

Figure 16:
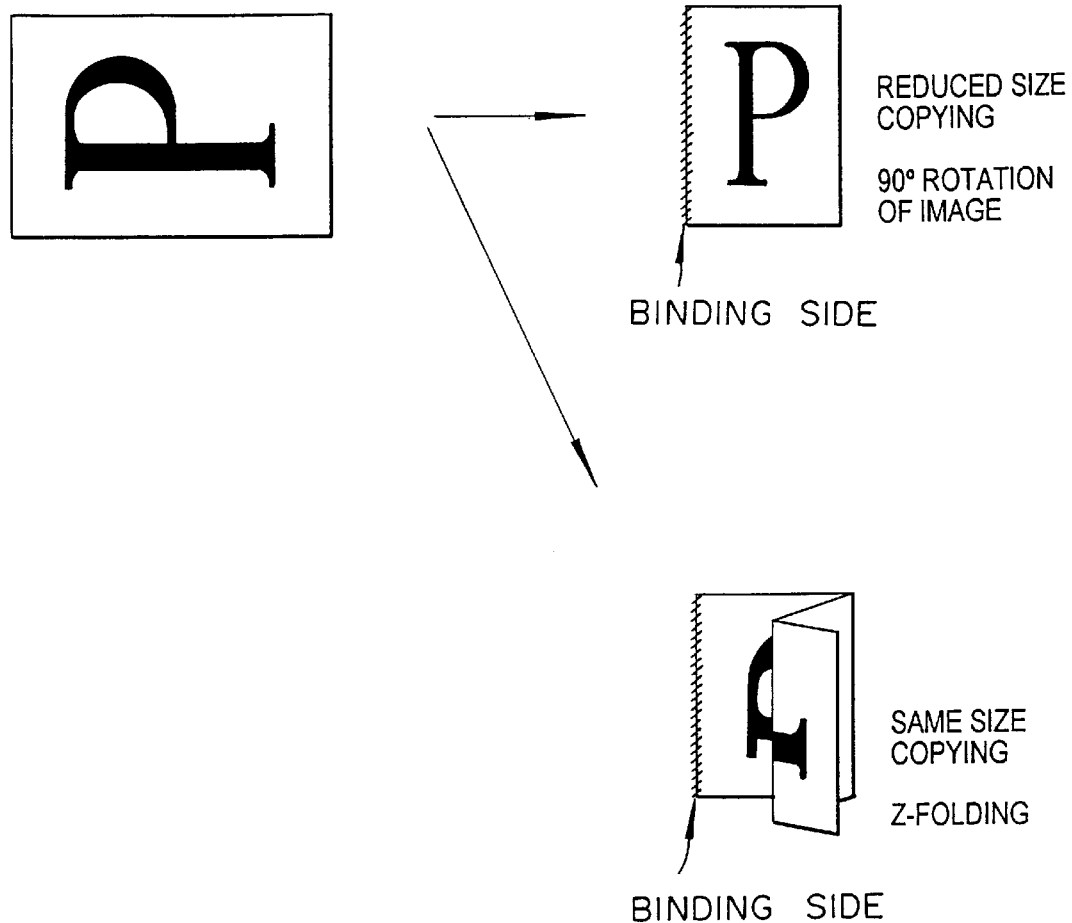
FIG. 16 is an explanatory drawing illustrating one example of image size reduction and Z-folding performed on the copying machine.

FIG. 16 shows some examples of the image reduction and Z-folding conducted on a copying machine. As shown in the top left corner of the drawing, if the original document size is A3 and if it is determined that the reduction will not affect the legibility of the characters, the copy output will be reduced and rotated 90° as shown in the top right corner of the drawing. If it is determined that the legibility of the characters will be affected, it will be copied to the exact same size as the original and the Z-folding will be conducted as shown in the bottom right corner of the drawing.

The output paper will be discharged to the discharge unit 56 after bound by the binding device 5.

Thus, a decision will be made whether the copying will be made on paper of a standard size that matches with the exclusive use cover obtained from the market, or on paper of a size larger than the cover to avoid the legibility of the characters from being affected. If copying is made on the larger size paper, it is automatically Z-folded to fit the exclusive use cover.

In other words, the system determines whether the legibility of the characters in the image read from the original document will be affected due to the enlargement/reduction process, select a proper enlargement/reduction ratio or Z-folding, and execute printing on the paper that matches the exclusive use cover size, or Z-folding as needed. Therefore, even if the original document size is different from the exclusive use cover size, the legibility of the characters will be guaranteed and the printed output will be produced on paper of a proper size matching the exclusive use cover automatically. In other words, good-looking bookbinding can be easily accomplished for documents of varying sizes without manually adjusting enlargement/reduction factors.

Moreover, better-looking bookbinding is made possible due to the fact that the printed paper is conveyed automatically to the exclusive use cover and aligned properly before bound in the binding device.

It is obvious that this invention is not limited to the particular embodiments shown and described above but may be variously changed and modified without departing from the technical concept of this invention.

Although it is explained in the discussion of the present embodiment that the pre-glued exclusive use cover is to be used, the same result can be achieved by applying a glue on the cover before binding.

The entire disclosure of Japanese Patent Application No. 09-005742 filed on Jan. 16, 1997, including the specification, claims, drawings and summary are incorporated herein by reference in its entirety.

What is claimed is:

1. A finisher connected to an image forming apparatus, comprising:
   a folding device which folds a printed paper into a z-shape;
   a binding device which binds a sheaf of papers into a preset size; and
   a control unit which determines whether a property of an image to be printed will be affected or not when the image is printed on a paper of a preset size, and prints the image on the paper of the preset size if it is determined that the property will not be affected, or folds the printed paper into the z-shape after printing if it is determined that the property will be affected.

2. A finisher according to claim 1, wherein the paper that is folded into the Z-shape is twice as large as the paper of the preset size.

3. A finisher according to claim 1, wherein the image forming apparatus is a digital copying machine.

4. A finisher according to the claim 1, wherein the image forming apparatus prints the image in a reduced size to fit onto the paper of the preset size if the image to be printed is larger than the preset size of the paper.

5. A finisher according to the claim 4, wherein the image forming apparatus rotates the image to be printed in addition to reducing the size of the image.

6. A finisher according to the claim 1, wherein the property of the image is legibility of characters.

7. A finisher according to the claim 6, wherein the legibility of characters is determined by widths of text rows in the image to be printed.

8. A finisher according to the claim 1, wherein said binding device binds the sheaf of printed papers using an exclusive use cover.

9. A finisher according to the claim 8, wherein said preset size is determined according to the exclusive use cover.

10. A finisher system for printing images and binding printed paper, comprising:
    a printing device which prints an image;
    a folding device which folds a printed paper into a z-shape;
    a binding device which binds a sheaf of papers into a preset size; and
    a control unit which determines whether an image property to be printed will be affected or not when the image is printed on the paper of the preset size, and prints the image on the paper of the preset size if it is determined that said property will not be affected, or prints the image on a paper twice as large as the preset size and folds the paper into the z-shape if it is determined that said property will be affected.

11. A finisher system according to the claim 10, wherein said printing device prints the image in a reduced size to fit onto the paper of the preset size if the image to be printed is larger than the preset size of the paper.

12. A finisher system according to the claim 11, wherein said printing device rotates the image to be printed in addition to reducing the size of the image.

13. A finisher system according to the claim 10, wherein said property of the image is legibility of characters.

14. A finisher system according to the claim 13, wherein said legibility of characters is determined by widths of text rows in the image to be printed.

15. A finisher system according to the claim 10, wherein said binding device binds the sheaf of printed papers using an exclusive use cover.

16. A finisher system according to the claim 15, wherein said preset size is determined according to said exclusive use cover.

17. A finisher system for printing images and binding printed paper, comprising:
    an enlargement/reduction unit which enlarges or reduces an image;
    a printing device which prints an enlarged or reduced image on a paper of a preset size;
    a folding device which folds a printed paper into a Z-shape;
    a binding device which binds a sheaf of papers; and
    a control unit which determines whether an image property will be affected or not when a reduced image is printed on the paper of the preset size, and prints the reduced images on the paper of the preset size if it is determined that said property will not be affected, or prints the image on a paper twice as large as the preset size and folds the paper into the Z-shape if it is determined that said property will be affected.

18. A finisher system according to the claim 17, wherein said property of the image is legibility of characters.

19. A finisher system according to the claim 18, wherein the legibility of characters is determined by widths of text rows in the image to be printed.

20. A finisher system according to the claim 17, wherein said binding device binds the sheaf of printed papers using an exclusive use cover.

21. A finisher system according to the claim 20, wherein said preset size is determined according to said exclusive use cover.

22. A finisher system for binding papers after copying, comprising:
    a copying device which copies an original document;
    a folding device which folds a paper having an image copied in said copying device into a z-shape;
    a binding device which binds a sheaf of papers into a preset size; and
    a control unit which determines whether a document image property to be printed will be affected or not when a document image is copied on the paper of the preset size, and copies the image on the paper of the preset size if it is determined that said property will not be affected, or copies the image on a paper twice as large as the preset size and folds the paper into the z-shape if it is determined that said property will be affected.

23. A finisher system according to the claim 22, wherein said copying device copies the document image in a reduced size to fit onto the paper of the preset size if the document to be printed is larger than the preset size of the paper.

24. A finisher system according the claim 23, wherein said copying device rotates a copied image to be printed in addition to reducing the size of the copied image.

25. A finisher system according to the claim 22, wherein said property of the document is legibility of characters.

26. A finisher system according to the claim 25, wherein said legibility of characters is determined by widths of text rows in the document to be copied.

27. A finisher system according to the claim 22, wherein said binding device which binds the sheaf of papers using an exclusive use cover.

28. A finisher system according to the claim 27, wherein said preset size is determined according to said exclusive use cover.

* * * * *